(12) United States Patent
Izzat et al.

(10) Patent No.: US 10,838,067 B2
(45) Date of Patent: Nov. 17, 2020

(54) OBJECT DETECTION SYSTEM

(71) Applicant: Aptiv Technologies Limited, St. Michael (BB)

(72) Inventors: Izzat H. Izzat, Oak Park, CA (US); Susan Chen, Los Angeles, CA (US)

(73) Assignee: Aptiv Technologies Limited, St. Michael (BB)

( * ) Notice: Subject to any disclaimer, the term of this patent is extended or adjusted under 35 U.S.C. 154(b) by 874 days.

(21) Appl. No.: 15/407,419

(22) Filed: Jan. 17, 2017

(65) Prior Publication Data

US 2018/0203124 A1  Jul. 19, 2018

(51) Int. Cl.
  *G01S 17/00*   (2020.01)
  *G01S 17/931*  (2020.01)
  *G01S 17/89*   (2020.01)
  *G01S 13/86*   (2006.01)
  *G01S 17/42*   (2006.01)

(52) U.S. Cl.
  CPC .......... *G01S 17/931* (2020.01); *G01S 13/865* (2013.01); *G01S 17/42* (2013.01); *G01S 17/89* (2013.01)

(58) Field of Classification Search
  USPC ............................................... 356/3.01–5.15
  See application file for complete search history.

(56) References Cited

U.S. PATENT DOCUMENTS

| | | | | |
|---|---|---|---|---|
| 6,714,663 B1* | 3/2004 | Bornowski | ............. | G06T 17/00 382/106 |
| 6,903,677 B2* | 6/2005 | Takashima | ............ | G01S 13/931 342/70 |
| 8,127,233 B2* | 2/2012 | McDowell | ........... | H04N 19/467 19/467 |
| 8,340,357 B2* | 12/2012 | Iwasaki | ................... | G06T 7/215 382/107 |
| 8,379,926 B2* | 2/2013 | Kanhere | ................. | G06T 7/254 382/104 |

(Continued)

FOREIGN PATENT DOCUMENTS

DE  10 2007 013023 A1  9/2008
WO  2011/066602 A1  6/2011

*Primary Examiner* — James R Hulka
(74) *Attorney, Agent, or Firm* — Colby Nipper PLLC

(57) ABSTRACT

An object detection system includes a lidar-unit and a controller. The controller defines an occupancy-grid that segregates the field-of-view into columns, determine a first-occupancy-status of a column based on first-cloud-points detected by the lidar-unit in the column by a first-scan, determine a second-occupancy-status of the column based second-cloud-points detected in the column by a second-scan, determine a first-number of the first-cloud-points and a second-number of the second-cloud-points, and determine a dynamic-status of the column only if the column is classified as occupied by either the first-occupancy-status or the second-occupancy-status. The dynamic-status of the column is determined to be moving when a count-difference between the first-number and the second-number is greater than a difference-threshold, and the dynamic-status of the column is determined to be static when the count-difference is not greater than the difference-threshold and a registration-factor that aligns the first-cloud-points to the second-cloud-points is less than a registration-threshold.

9 Claims, 7 Drawing Sheets

(56) References Cited

U.S. PATENT DOCUMENTS

| | | | |
|---|---|---|---|
| 8,577,538 B2* | 11/2013 | Lenser | G05D 1/0038 |
| | | | 701/28 |
| 8,825,391 B1 | 9/2014 | Urmson et al. | |
| 9,280,711 B2* | 3/2016 | Stein | G06T 7/248 |
| 9,435,887 B2* | 9/2016 | Kim | G01P 3/36 |
| 9,575,184 B2* | 2/2017 | Gilliland | G01S 7/4816 |
| 9,779,296 B1* | 10/2017 | Ma | G06K 9/00463 |
| 10,066,946 B2* | 9/2018 | Doria | G06T 7/00 |
| 10,127,636 B2* | 11/2018 | Ma | G06K 9/6211 |
| 10,380,451 B2* | 8/2019 | Falb | G06K 9/4604 |
| 10,692,395 B2* | 6/2020 | Mackenzie | A61B 17/00 |
| 2004/0189512 A1* | 9/2004 | Takashima | G01S 13/931 |
| | | | 342/70 |
| 2008/0027591 A1* | 1/2008 | Lenser | G05D 1/0251 |
| | | | 701/2 |
| 2009/0080523 A1* | 3/2009 | McDowell | H04N 19/51 |
| | | | 375/240.15 |
| 2010/0204964 A1* | 8/2010 | Pack | G06T 7/521 |
| | | | 703/1 |
| 2010/0322476 A1* | 12/2010 | Kanhere | G08G 1/0175 |
| | | | 382/103 |
| 2011/0181864 A1 | 7/2011 | Schmitt et al. | |
| 2011/0224840 A1 | 9/2011 | Vanek | |
| 2011/0228987 A1* | 9/2011 | Iwasaki | G06T 7/215 |
| | | | 382/107 |
| 2011/0282581 A1* | 11/2011 | Zeng | G01S 17/936 |
| | | | 701/301 |
| 2012/0069185 A1* | 3/2012 | Stein | G06K 9/00798 |
| | | | 348/148 |
| 2014/0368807 A1 | 12/2014 | Rogan | |
| 2015/0356454 A1 | 12/2015 | Zeng | |
| 2016/0003946 A1* | 1/2016 | Gilliland | G01S 17/10 |
| | | | 356/5.01 |
| 2016/0018524 A1 | 1/2016 | Zeng | |
| 2016/0116593 A1* | 4/2016 | Kim | G01S 17/06 |
| | | | 701/70 |
| 2016/0132745 A1* | 5/2016 | Falb | G06K 9/4604 |
| | | | 348/148 |
| 2016/0162742 A1 | 6/2016 | Rogan | |
| 2016/0350592 A1* | 12/2016 | Ma | G06K 9/4671 |
| 2017/0057495 A1 | 3/2017 | Walessa | |
| 2017/0286764 A1* | 10/2017 | Ma | G06T 7/11 |
| 2018/0058861 A1* | 3/2018 | Doria | G01C 21/32 |
| 2018/0247560 A1* | 8/2018 | Mackenzie | G09B 5/04 |
| 2019/0120946 A1* | 4/2019 | Wheeler | G01S 17/89 |
| 2019/0120948 A1* | 4/2019 | Yang | G01S 17/931 |
| 2019/0122386 A1* | 4/2019 | Wheeler | G01S 7/4817 |

* cited by examiner

OBJECT DETECTION SYSTEM

TECHNICAL FIELD OF INVENTION

This disclosure generally relates to an object detection system, and more particularly relates to a system that determines a dynamic-status of an object proximate to an automated-vehicle based on changes in the cloud-points in an array of columns defined by the system.

BACKGROUND OF INVENTION

It is known to use a Light Detection and Ranging unit, which may also be known as LIDAR or LiDAR and is hereafter referred to as lidar, on an automated vehicle to detect moving objects such as other-vehicles and/or stationary or static objects such as signs, light-poles, barriers, and the like. As the resolution of economical lidar units continues to increase, the data processing burden also increases which makes the cost of automotive image-data-processing controllers to undesirably increase.

SUMMARY OF THE INVENTION

In accordance with one embodiment, an object detection system that determines a dynamic-status of an object proximate to an automated-vehicle is provided. The system includes a lidar-unit and a controller. The lidar-unit is used to detect cloud-points in a field-of-view of the lidar-unit proximate to a host-vehicle. The controller is in communication with the lidar-unit. The controller is configured to define an occupancy-grid that segregates the field-of-view into an array of columns, determine a first-occupancy-status of a column based on a first-height of first-cloud-points detected in the column by a first-scan taken by the lidar-unit at a first-time, wherein the first-occupancy-status is determined to be occupied when the first-height is greater that a height-threshold, determine a second-occupancy-status of the column based on a second-height of second-cloud-points detected in the column by a second-scan taken by the lidar-unit at a second-time subsequent to the first-time, wherein the second-occupancy-status is determined to be occupied when the second-height is greater than the height-threshold, determine a first-number of the first-cloud-points detected in the column by the first-scan, determine a second-number of the second-cloud-points detected in the column by the second-scan, determine a dynamic-status of the column only if the column is classified as occupied by either the first-occupancy-status or the second-occupancy-status. The dynamic-status of the column is determined to be moving when a count-difference between the first-number and the second-number is greater than a difference-threshold, and the dynamic-status of the column is determined to be static when the count-difference is not greater than the difference-threshold and a registration-factor that aligns the first-cloud-points to the second-cloud-points is less than a registration-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
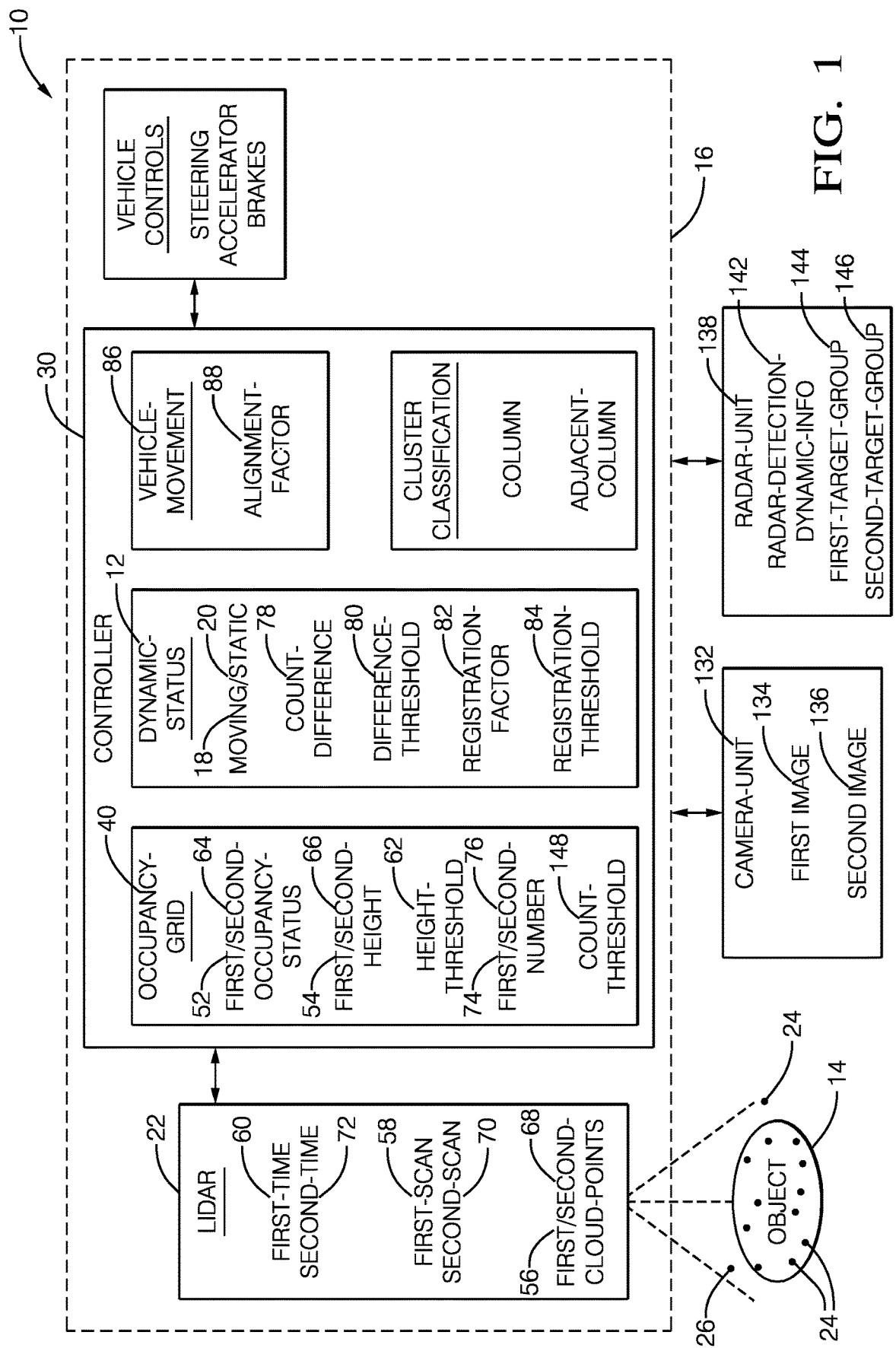
FIG. 1 is a diagram of an object detection system in accordance with one embodiment.
Figure 2:
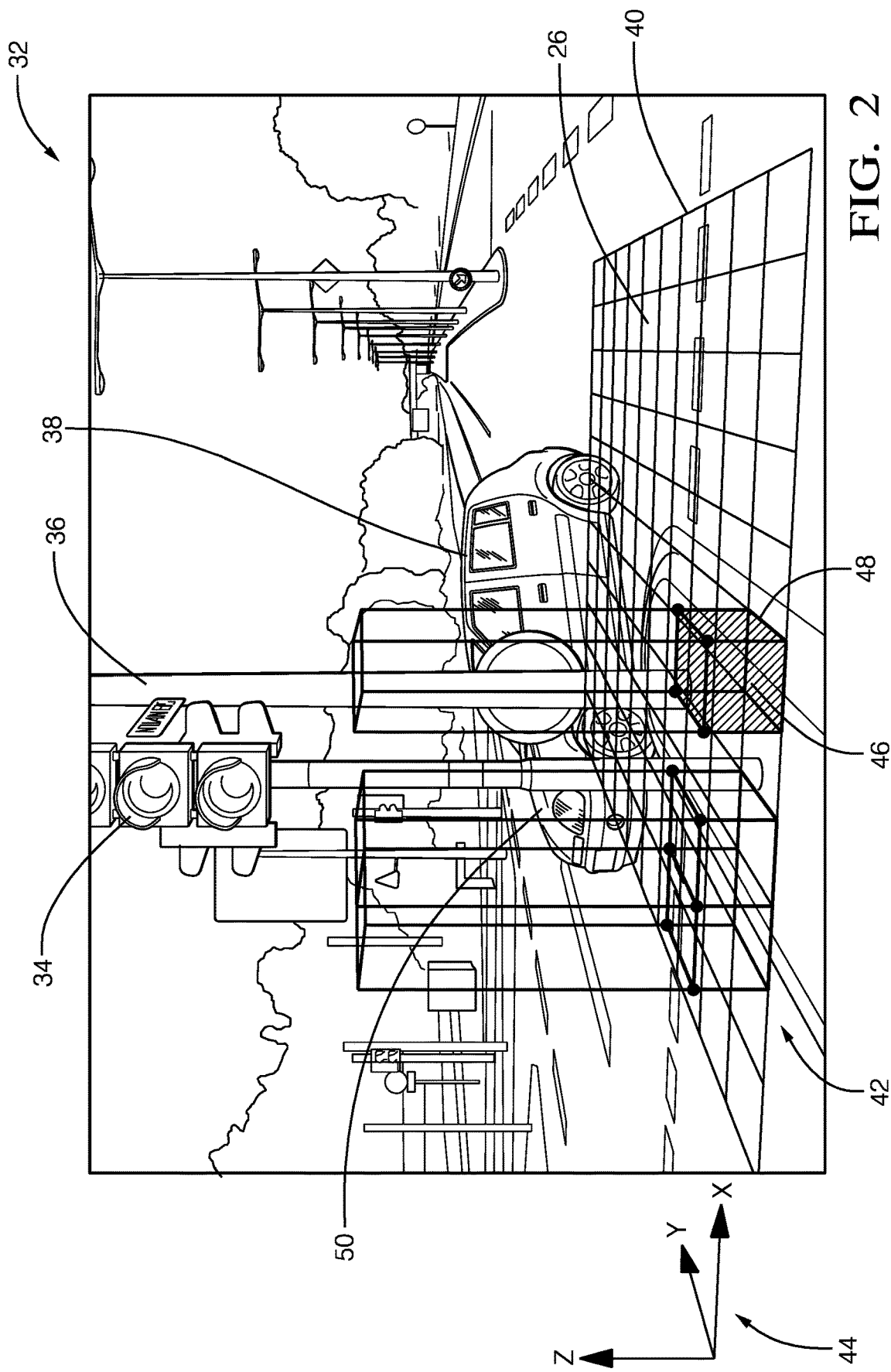
FIG. 2 is an isometric-view of a traffic-scenario segregated by an occupancy grid defined by the system of FIG. 1 in accordance with one embodiment.

FIG. 1 illustrates a non-limiting example of an object detection system 10, hereafter referred to as the system 10. In general, the system 10 determines a dynamic-status 12 of an object 14 proximate to an automated vehicle, for example a host-vehicle 16. As used herein, the term automated vehicle may apply to instances when the host-vehicle 16 is being operated in an automated-mode, i.e. a fully autonomous mode, where a human-operator (not shown) of the host-vehicle 16 may do little more than designate a destination in order to operate the host-vehicle 16. However, full automation is not a requirement. It is contemplated that the teachings presented herein are useful when the host-vehicle 16 is operated in a manual-mode where the degree or level of automation may be little more than the system 10 providing an audible or visual warning to the human-operator who is generally in control of the steering, accelerator, and brakes of the host-vehicle 16. For example, the system 10 may merely assist the human-operator as needed to change lanes and/or avoid interference with and/or a collision with, for example, an instance of the object 14 such as an other-vehicle 38 (FIG. 2), a pedestrian, or a sign-post 36 (FIG. 2). As will be explained in more detail below, the dynamic-status 12 may be classified as moving 18 or static 20, but the dynamic-status 12 is not limited to only these classifications.

Continuing to refer to FIG. 1, the system 10 includes a lidar-unit 22 used to detect instances of cloud-points 24 in a field-of-view 26 of the lidar-unit 22 proximate to a host-vehicle 16. As will be recognized by those in the art, the lidar-unit 22 scans a laser-beam across the field-of-view 26, and the direction and distance to each instance of the cloud-points 24 where the laser-beam is reflected and detected by the lidar-unit 22 is recorded or stored as an instance of one of the cloud-points 24.

The system 10 also includes a controller 30 in communication with the lidar-unit 22. The communication between the lidar-unit 22 and the controller 30 may be provided by, but not limited to, wires, optical-cables, or wireless communication. The controller 30 may include a processor (not specifically shown) such as a microprocessor or other control circuitry such as analog and/or digital control circuitry including an application specific integrated circuit (ASIC) for processing data as should be evident to those in the art. The controller 30 may include memory (not specifically shown), including non-volatile memory, such as electrically erasable programmable read-only memory (EEPROM) for storing one or more routines, thresholds, and captured data. The one or more routines may be executed by the processor to perform steps for determining the dynamic-status 12 of the object 14 based on signals received by the controller 30 from the lidar-unit 22 as described herein.

FIG. 2 illustrates a non-limiting example of a traffic-scenario 32 that may be encountered by the host-vehicle 16 while equipped with the system 10. The illustration is comparable to what would be seen from the host-vehicle 16 or an image rendered by a camera mounted on the host-vehicle 16. As previously mentioned, the amount of data available from commercially available examples of the lidar-unit 22 may be more data than is necessary for the system 10 to determine or discern when the object 14 in the field-of-view 26 is static 20, e.g. a traffic-signal 34 or a sign-post 36, and which instances of the object 14 are moving 18, e.g. the other-vehicle 38. The system 10 described herein is an improvement over prior comparable systems in that the lidar data processing by the controller 30 is performed in a manner that reduces the processing burden on the controller 30 so that more economical configurations of the controller 30 can be used.

To this end, the controller 30 is configured or programmed to define an occupancy-grid 40 that segregates the field-of-view 26 into an array of columns 42. The occupancy-grid 40 is typically horizontally level, i.e. parallel to level-ground or parallel to a plane defined by the x-axis and the y-axis of a typical x-y-z version of a reference-frame 44 that may be referenced to the host-vehicle 16, and may be positioned to effectively 'hover' above the ground. The columns 42 are then typically oriented vertically. The occupancy-grid 40 shown in FIG. 2 is illustrated as being substantially coarser (i.e. the cell 46 is larger) than what is envisioned for the system 10, and only two instances of the columns 42 are shown, only to simplify the illustration. By way of example and not limitation, each cell 46 of the occupancy-grid 40 for a typical embodiment of the system 10 will be twenty centimeters square (0.2 m×0.2 m), and every cell 46 of the occupancy-grid 40 will have a corresponding column. Also, it is envisioned that the area of the field-of-view 26 covered by the occupancy-grid 40 will be larger than what is illustrated, and the columns 42 may be taller or shorter than illustrated.

The coordinates (e.g. range, azimuth angle, elevation angle) of each instance of the cloud-points 24 are stored so each instance of the cloud-points 24 can be associated with a corresponding instance of a column 48. That is, if the coordinates of an instance of the cloud-points 24 is located within the boundaries of the column 48 which are determine by the boundaries of the cell 46 defined by the occupancy-grid 40, then the instance of the cloud-points 24 in question is assigned to or associated with the column 48. If the object 14 is the traffic-signal 34 mounted on a pole, then there may be many instances of cloud-points 24 associated with the column 48 because of the vertical nature of the traffic-signal 34 and the supporting pole. However, if the column 48 were positioned so as to correspond to or align with the hood 50 of the other-vehicle 38, then there may be only a few instances of the cloud-points 24 associated with the column 48.

Figure 3B:
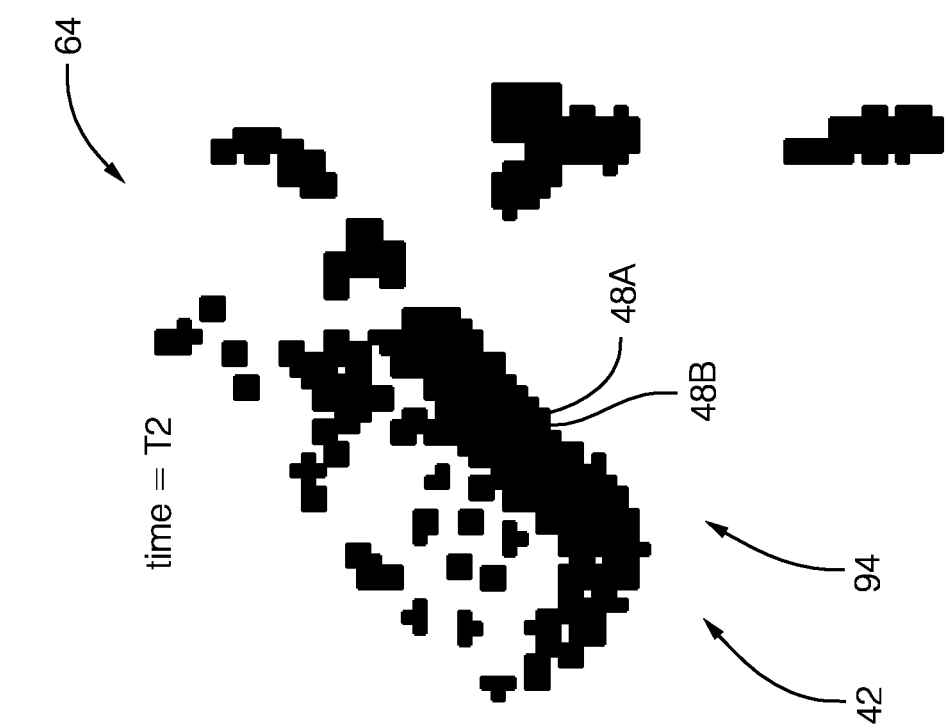
FIGS. 3A and 3B are top-views of the occupancy grid defined by the system of FIG. 1 in accordance with one embodiment.
Figure 3A:
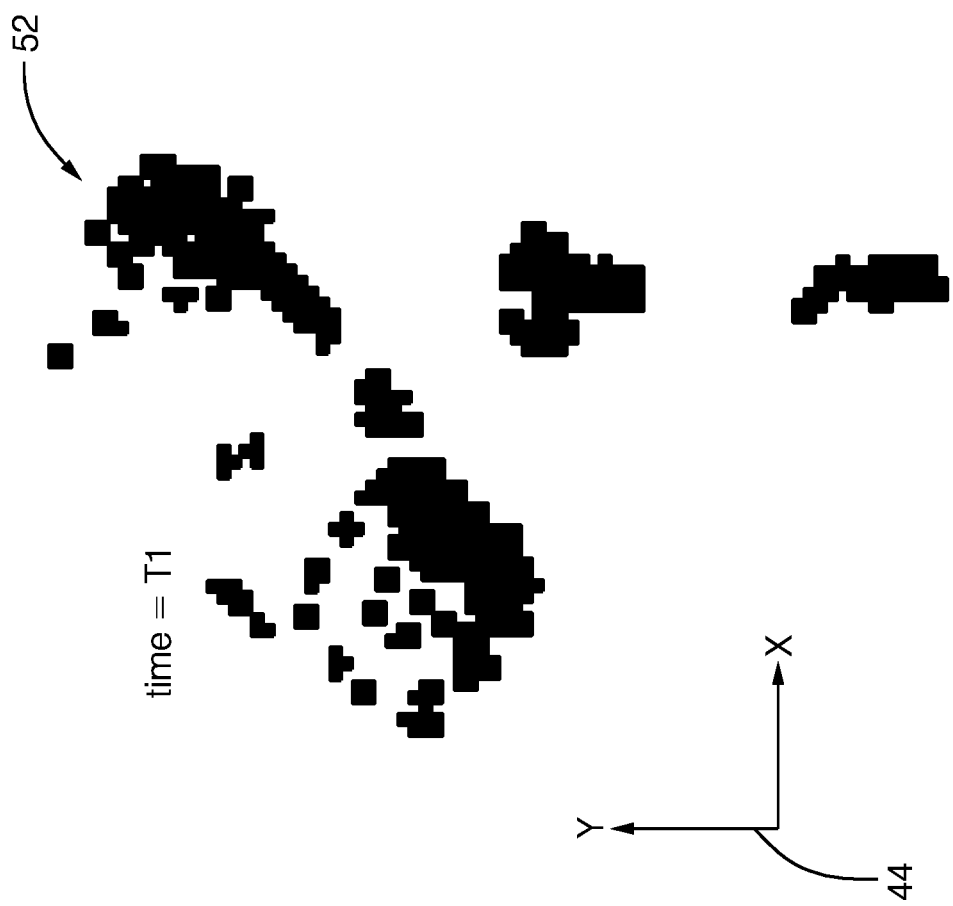

FIG. 3A illustrates a non-limiting example of a first-occupancy-status 52 of the occupancy-grid 40 at a particular instant in time. In FIG. 2 the occupancy-grid 40 is viewed from an isometric perspective that corresponds to a three-dimensional (3D) perspective. FIG. 3A (and FIG. 3B) show a view of the occupancy-grid 40 from above thereby having a top-view, two-dimensional (2D) appearance. Each pixel corresponds to a cell or a column in the occupancy-grid 40, and the cell or the column is determines to be 'occupied' or 'empty' or some other status based on the evaluation of the cloud-points 24 in column, which is described in more detail below. FIG. 3B illustrates the status of columns in the occupancy-grid at a different instant in time that FIG. 3A. In these non-limiting examples the other-vehicle 38 is moving from right to left and the relative positions of the other-vehicle 38 to the traffic-signal 34 and the sign-post 36 suggest that FIG. 2 is from a time T0 prior to a time T1 of FIG. 3A, and FIG. 3B is from a time T2 subsequent to the time T1. As will be explained in more detail below, the system 10 compares data from two instants in time (e.g. T1 and T2) to determine the dynamic-status 12 of the object 14.

From the lidar provided coordinates (e.g. range, azimuth angle, elevation angle) of each instance of the cloud-points 24 a height of each cloud-point can be determined to separate those cloud-points associated with the ground (e.g. the roadway) from those cloud-points not associated with the ground, e.g. the object 14. Using the heights, the controller 30 may determine the first-occupancy-status 52 of the column 48 based on a first-height 54 of first-cloud-points 56 detected in the column 48 by a first-scan 58 taken by the lidar-unit 22 at a first-time 60 (T1). The first-height 54 may be, for example, an average of the heights of the cloud-points 24 in the column 48, or some other evaluation method suitable to distinguish instances of the cloud-points 24 that are ground-points from non-ground-points. That is, the controller 30 distinguishes those instances of the cloud-points 24 that are roadway or ground from those instances of the cloud-points 24 that are associated with something that is above the roadway. By way of example, the first-occupancy-status 52 may be determined to be 'occupied' (indicated by a black pixel or cell) when the first-height 54 is greater that a height-threshold 62, e.g. ten centimeters (10 cm). By contrast, the first-occupancy-status may be determined to be 'empty' when all instances of the cloud-points 24 located in the column 48 have a height of less than five centimeters (5 cm).

Referring to FIG. 1 and FIG. 3B, the controller 30 may subsequently determine a second-occupancy-status 64 of the column 48 based on a second-height 66 of second-cloud-points 68 detected in the column by a second-scan 70 taken by the lidar-unit at a second-time 72 subsequent to the first-time 58, wherein the second-occupancy-status 64 is determined to be occupied (indicated by a black pixel or cell) when the second-height 66 is greater than the height-threshold 62. The same rules described above to determine if the column is 'occupied' or 'empty' may be used again to determine the second-occupancy-status 64.

In further pursuance of determining the dynamic-status 12 of the cell 46 or the column 48 in the occupancy-grid 40, the controller 30 is configured to determine a first-number 74 of the first-cloud-points 56 detected in the column 48 by the first-scan 58. That is, the controller 30 counts the number of cloud-points detected in each instance of the columns 42, e.g. the column 48, during the first-scan 58. Similarly, the controller 30 is configured to determine a second-number 76 of the second-cloud-points 68 detected in the columns 42 or the column 48 by the second-scan 70. As will become apparent in the description that follows, a relative comparison of the values of the first-number 74 and the second-number 76 can be used to determine that the dynamic-status 12 is moving 18 or static 20 rather than the more computational complex technique of tracking the relative movement of the first-cloud-points 56 detected at the first-time 60 to the second-cloud-points 68 detected at the second-time 72.

Typically, the controller 30 determines the dynamic-status 12 of the column 48 only if or when the column 48 is classified as occupied by either the first-occupancy-status 52 or the second-occupancy-status 64. However, it is recognized that when a column is classified as 'occupied' in one of the first-scan 58 or the second-scan 70 and classified as 'empty' in the other it may be an indication that the cloud-points 24 that were present in the column when classified as 'occupied' could be classified by the dynamic-status 12 as moving 18. The dynamic-status 12 of the column 48 may be determined to be moving 18 when a count-difference 78 between the first-number 74 and the second-number 76 is greater than a difference-threshold 80, eight (8) for example. It is contemplated that empirical testing would be used to optimize the selection of the difference-threshold 80 and that the value of the difference-threshold 80 would be dependent on the resolution of the lidar-unit 22.

Figure 4B:
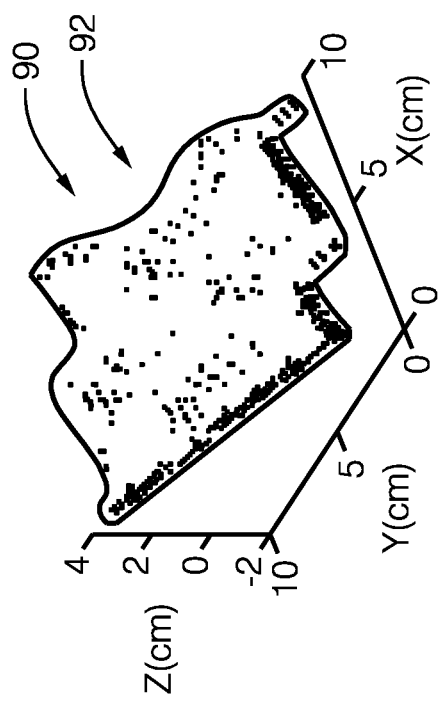
FIGS. 4A and 4B are isometric view of surfaces indicated by cloud-points detected by the system of FIG. 1 in accordance with one embodiment.
Figure 4A:
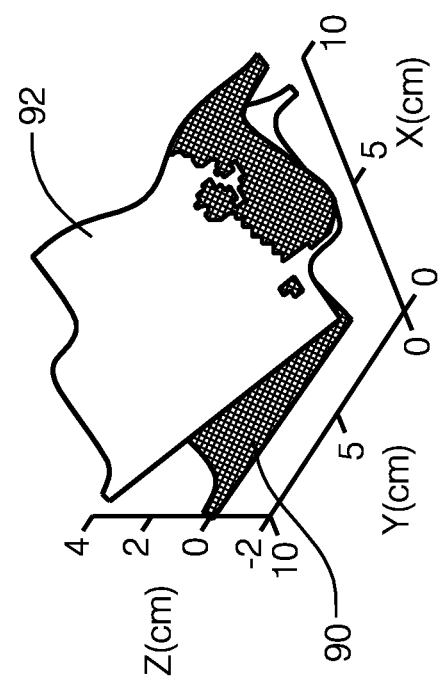

FIGS. 4A and 4B illustrate a non-limiting example of a first-surface 90 defined by cloud-points in a column from the first-scan 58, and a second-surface 92 defined by cloud-points in the same column from the second-scan 70. A registration-factor 82 (FIG. 1) may be determined based on how much translation and rotation of the first-surface 90 is necessary to align the first-surface 90 with the second-surface 92. To determine the registration-factor 82 the first-surface 90 may be iteratively moved until the error or difference between the two surfaces becomes less than a registration-threshold 84, or the number of iterations reaches some predefined limit. For example, the dynamic-status 12 of the column 48 may be determined to be static 20 when both the count-difference 78 is not greater than the difference-threshold 80, and the registration-factor 82 that aligns the first-surface 90 (defined by the first-cloud-points 56) to the second-surface 92 (defined by the second-cloud-points 70) is less than a registration-threshold 84, the value of which may be empirically determined.

It is recognized that some of the change in the cloud-points 24 in the columns 42 may be caused by movement of the lidar-unit 22 because the host-vehicle 16 is traveling. That is, some of the differences between the first-cloud-points 56 and the second-cloud-points 70 may be caused by movement of the host-vehicle 16 rather than solely based on movement of the object 14. Accordingly, the controller 30 may be configured to align the second-scan 70 to the first-scan 58 based on movement of the host-vehicle 16 between the first-time 60 and the second-time 72. For example, vehicle-movement 86 of the host-vehicle 16 may be tracked based on wheel-rotation and steering-angle, or tracked based on movement relative to a known fixed or static object (e.g. the sign-post 36) to determine an alignment-factor 88. The alignment-factor 88 may be used to align the first-cloud-points 56 to the second-cloud-points 70 which may appear similar to the alignment process shown in FIGS. 4A and 4B.

Referring now to FIGS. 3A and 3B, each of the darkened or shaded pixels corresponds to an instance of a column or cell that has been classified as occupied. In order to determine which instances of the colons are associated with an instance of the object 16, an instance of the column (e.g. column 48A) may be associated with an adjacent-column 48B to form a cluster 94 when both the column 48A and the adjacent-column 48B are classified as occupied, and the dynamic-status 12 of the cluster 94 is determined to be moving 18 when a majority of the columns 42 (i.e. darkened pixels) that form the cluster 94 are classified as moving 18. That is, if a few of the columns 42 that form the cluster 94 are classified as static 20 (e.g. a column located in a horizontal area of the other-vehicle 38 such as the middle of the hood where movement may not be detected), those instances of static columns may be included in the cluster 94 formed of mostly columns classified as moving.

LiDAR is a laser sensor that utilizes one or multiple laser beams to locate obstacles in its field-of-view and is known for its capability to depict this information in a dense three-dimensional (3D) cloud-points. The input data can have the representation of cylindrical or Cartesian coordinates, with the later allowing for easier fusion with other sensors. Detecting objects from LiDAR point cloud can be done in a number of methods. In one embodiment, objects are detected using an Occupancy grid. There are many possible methods for building an occupancy grid. For example the Occupancy grid can be 2.5D centered at the car or it can be 3D with voxels. The 2.5D occupancy grid is the most popular due to its reduced computation cost. In this approach, the field-of-view, for example 100m×100 m is divided into columns such as 20 cm×20 cm. Typically each column contains a number of LiDAR cloud-points with large number of points in the columns closer to the host-vehicle. The occupancy of the column is calculated using a number of measurements such as the max absolute difference of cloud-points in the column and the average of the height value. The occupancy of the column is typically defined as a priority value ranging from zero to one (0-1). Grid columns that do not contain any cloud-points are not defined and can be assigned an unknown label.

In order to segment the point cloud into objects, the occupancy grid columns are further processed using standard computer vision connected component analysis. In this approach, a column is first binarized by thresholding the probability of occupancy value inside each column setting all columns under a threshold to zero while setting other columns to one. The connected component algorithm assigns each grid column an object label. In another embodiment, objects can be detected using a clustering approach. In this approach cloud-points are first classified into ground or not ground. The non-ground cloud-points are further grouped into clusters using, for example, Euclidean distance measure between points.

The resulting objects or columns as described above contain only occupancy information. In order to complete our understating of objects in the scene, dynamic-attributes such as speed and acceleration or at least static or moving classification need to be added. LiDAR cannot provide these attributes directly and hence multiple consecutive scans must be processed. The registration of these scans can be very expensive using, for example, iterative closest point (ICP). In this disclosure, the point cloud scans are registered using occupancy grids by treating occupancy grid as a set of columns and comparing the column cloud-points to generate dynamic-attributes. This provides a computationally more attractive approach than ICP or its variation. In the disclosure, columns are used to reference occupancy grid cells since they contain cloud-points as opposed to 2D information.

Figure 5:
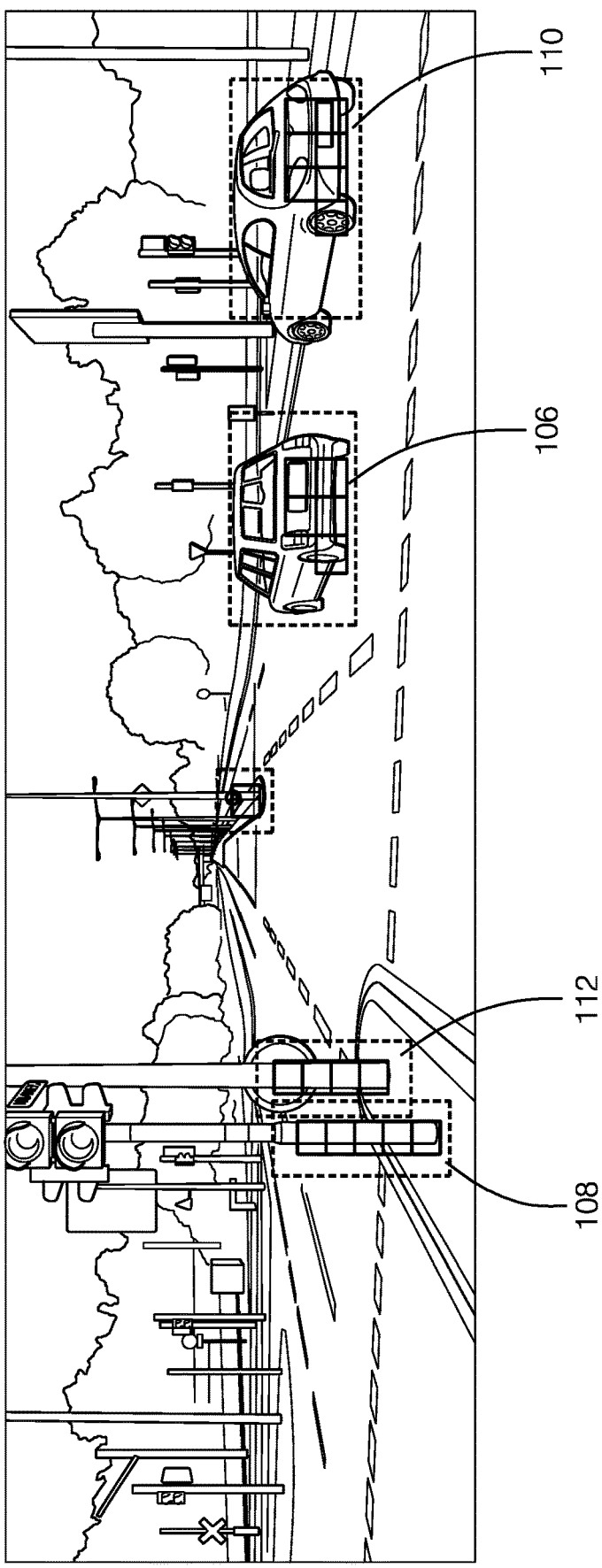
FIG. 5 shows an example of the dynamic-status information for both columns and objects overlaid on a camera image.

In this disclosure, dynamic-attributes can be defined at both the object and column level. This helps support different environmental representation. As an example, grid based representation, requires columns based dynamic-attributes. In this representation each column is assigned dynamic-attributes in addition to its probability of occupancy. For object based representation, a single value is defined for the entire object. FIG. 5 illustrates this concept in more detail. In the figure, dynamic-attributes are generated for each dynamic column 106 and static columns 108. The object level dynamic-attributes are only generated for the occupied columns only. In the figure, object level dynamic-attributes are also shown. In this case, dynamic object 110 and static object 112 include one more columns.

Dividing cloud-points into object can be time consuming and subject to error. In many cases, the lidar may not return sufficient cloud-points to segment objects correctly. In the rest of description, columns dynamic status is explained in detail. The same principle can be extended to objects by for, example, assigning the object dynamic status attribute if more columns in the object are classified as dynamic than static.

The dynamic-status of each column is determined by analyzing multiple lidar scans. Lidar scans the field-of-view multiple times, for example, ten times or every tenth of a second (0.1 s). In each scan, a large number of cloud-points are collected. To determine the dynamic-status of the occupancy grid columns an occupancy grid is created from two consecutive scans. This results in two occupancy grids constructed using the same method but the second scan contains time shifted information of the columns. If the host-vehicle is not moving and all of the objects in the scene are fixed, the two occupancy grids should match. However in most cases the two occupancy grids do not match since the host-vehicle maybe moving and/or some objects in the field of view are moving.

The columns in the second scan are then projected into the previous time using host-vehicle pose information. Host-vehicle pose includes rotation and translation that takes the host-vehicle from time t to time t+1. Host-vehicle pose can be obtained from sensors on the host-vehicle such as GPS, IMU, or wheel encoder readings. Most of these devices provide six-degrees of freedom pose (three of rotation and three of translation). The pose information is used to project one grid from one time instance to another based on the host-vehicle movement. For static columns, the information from the two scan, after adjusting with the pose information, should match while for dynamic columns two columns will contain different information. This is the main principle used to determine the dynamic-status of the column. Although the description above use only two scans, in many cases, more than two scans are used to increase the accuracy in dynamic-status determination.

An example of two scans occupancy grid is shown in FIGS. 3A and 3B. In the figure, black square indicate an occupied columns while white columns indicate empty columns. The figure includes two static objects (poles) and one moving (car). It can be seen from the figure, that static object stay in the same location after pose adjustment while moving object move into different location. This is the main principle used in column dynamic-status determination. It can be seen from the figure that the static object does not exactly match due to pose variation or possibly host-vehicle\lidar movement. Only occupied columns as determined by the occupancy grid are further processed for columns dynamic-status determination.

In one embodiment, a two-step procedure is used to determine the dynamic-status of the columns. In the first-step, the count-difference of cloud-points in corresponding column of the first scan and the second scan is compared to a difference-threshold. If the count-difference is larger than the difference-threshold, the column is classified as dynamic since it is an indication that points has moved into the column. The direction of change is important since if the column has points at time t but no points at t+1, it is an indication that the object in the column at t moved away and hence the column at time t is now static. On the other hand if the column at time t+1 has large number of cloud-points as compared to t, is an indication that new object moved into the column and hence the column at time t+1 is now classified as dynamic. It should be noted that, the difference-threshold can be fixed for all range or changed in regions further away from the host-vehicle. This is because at long ranges the number of cloud-points inside the column is typically small as compared to short ranges. For example, a value up to 20 m can be used, then a smaller value from 20 m to 40 m, and yet a smaller value over 40 m.

If the count-difference of cloud-points in corresponding column of the first scan and the second scan is less than a difference-threshold, the second-step compares the cloud-points in the two associated columns. Comparison of the two columns can be done in a number of methods. For example, methods like expectation maximization (EM) or ICP has been widely used. These techniques determines the rotation matrix (R) and translation vector (T) needed to move cloud-points from one scan to the other. If the R and T are small, the two columns are similar and hence is part of static object. In one embodiment, the registration-factor is defined to be the norm of T. The column is classified as static if the registration-factor is below a registration-threshold. Other possible registration-factor can be defined from both rotation and translation. An illustration of the procedure for computing R & T is shown in FIGS. 4A and 4B. In the figure, the first-surface 90 and second-surface 92 are shown in FIG. 4A. These surface represent cloud-points in columns in two consecutive scans. Using ICP, for example, the two surfaces are moved until they are close to each other as shown in FIG. 4B. The R and T resulting from the process are used for computing the registration-factor.

Figure 6:
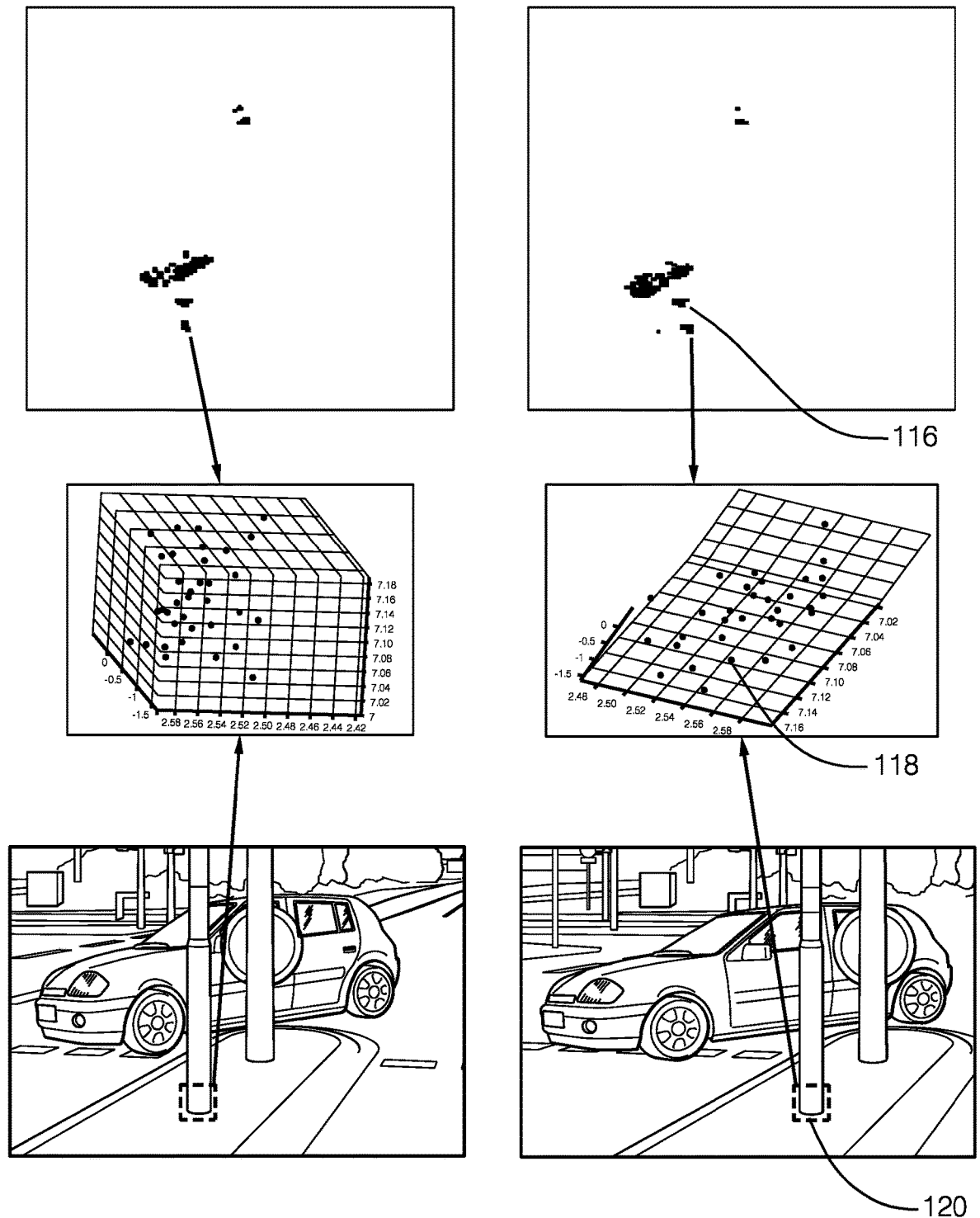
FIG. 6 shows detailed description for columns matching for dynamic grid creation using both lidar and camera, where the top row shows an example of occupancy grid for two scans, the middle row shows an example of cloud-points in two columns at the same location, and the last row show the column overlaid on camera images.

FIG. 6 shows an example of column matching in more detail. In the first row of the figure, two occupancy grids are created from two consecutive scans. The occupied column 116 contains cloud-points from lidar measurements, After pose alignment, the cloud-points 118 inside the occupied columns are analyzed to determine column dynamic-status. In FIG. 6, the middle row shows a 3D view of the column under consideration. Each column contains a number of 3D points 118. An important advantage of this approach is that columns are analyzed instead of object. This has the advantage in faster matching time and works well when objects cannot be segmented correctly or they are occluded. The principle can be extended from columns to objects by grouping neighboring columns to classify an entire object to either dynamic or static.

If the number of points inside the column is small, the registration-factor may not be computed reliably. This happens at long distance from the host-vehicle as most lidars do not provide dense point cloud at long range. To solve this, cloud-points can be interpolated inside the column, the column size can be increased to include more points or other sensors such as camera, or radar can be used when available. In FIG. 6, the lower row shows two camera images aligned with the lidar. The image area that corresponds to the column in the middle row is shown in 120. The registration-factor can then be computed from the camera and the lidar. Camera dynamic-status can be obtained by analyzing a sequence of images using, for example, optical flow. Since lidar do not provide highly dense data especially in area far away from the host-vehicle while camera can provide much denser data, a system that combines lidar and camera can produce more accurate results than using one sensor only.

In one embodiment, lidar and camera can be combined to compute dynamic-attributes of each column in the following way. First occupied columns from the lidar-unit in two consecutive scans are first identified. Then the camera image area corresponding to the occupied columns in two consecutive images are identified. The information in both the two lidar columns and the corresponding camera images areas are used to compute the registration-factor. For the camera, the registration factor can simply be the difference of intensity between the two columns location in camera images areas. In many cases camera can be more effective in computing the registration-factor especially when the number of points inside the column is small. Hence it would be given higher priority if the two sensors do not agree on dynamic-attribute. For columns with a small number of points less than count-threshold, only the camera is used to compute the registration-factor since small numbers of cloud-points in columns tend to produce incorrect dynamic-attributes.

In another embodiment, dynamic-status can be obtained from radar measurements. Automotive radar sensors report several signals, e.g. range, range rate, azimuth angle, and amplitude. These radar-detections can come from scattering centers on both stationary and dynamic objects. The most accurate signals coming from the radar are range to the object and range rate of the object. Persistent radar tracks can be obtained by tracking algorithms updated with the latest raw radar measurements. Additionally, fused tracking algorithms using inputs from radar, vision, and LiDAR sensors can provide fused tracks on both moving and stationary objects. The advantage of using tracking algorithms is that additional object information, e.g. acceleration, can be obtained.

Figure 7:
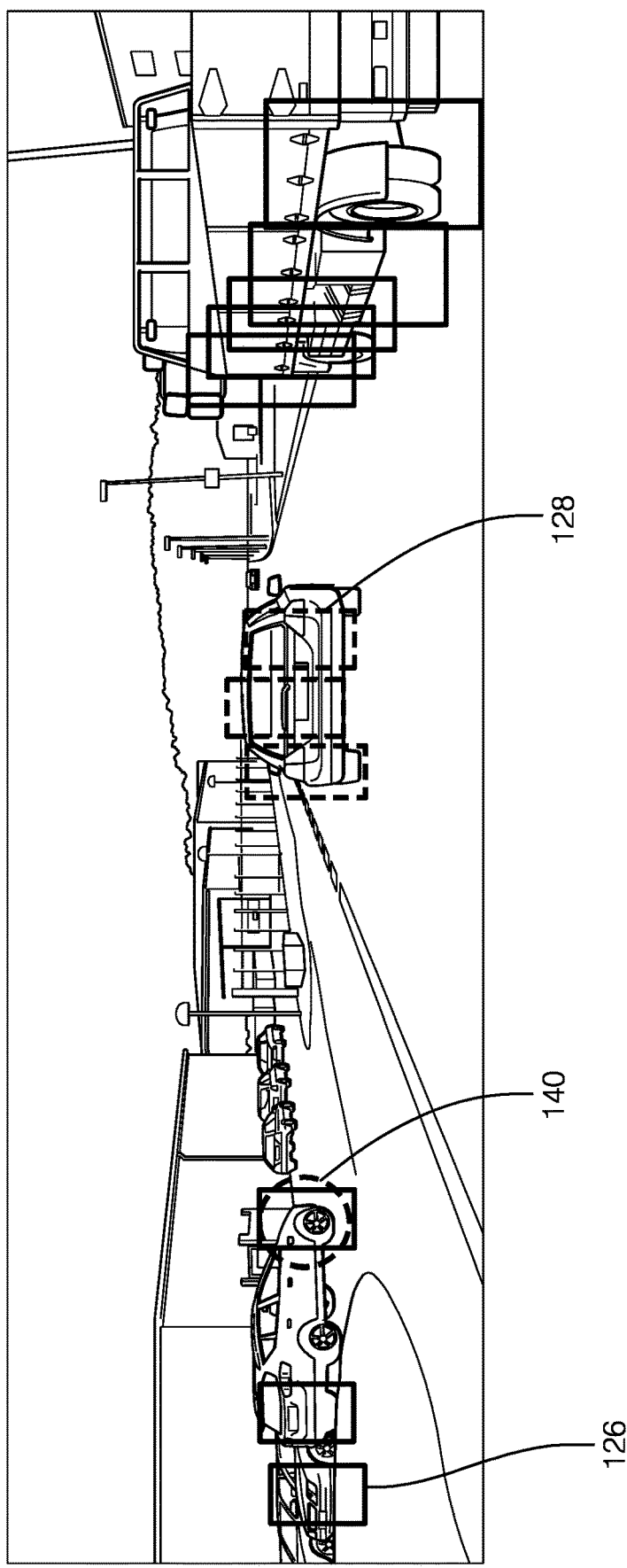
FIG. 7 shows an example of radar-detections overlaid on an image, where white dotted boxes denote radar-detections from a moving object, and black solid boxes denote radar-detection on stationary objects.

Radar sensor information can be used to update the dynamic occupancy grid by mapping the detection range information to the occupancy grid and allowing the range rate to help update whether a grid column is moving or stationary. Furthermore, if a tracker system is in place, over the ground (OTG) velocities and accelerations of radar objects can be obtained and added to enhance the information stored in the occupancy grid. As illustration, in FIG. 7, the black boxes 126 are persistent stationary radar tracks while the dotted white boxes 128 denote persistent moving radar tracks.

When raw radar-detections are used to update the dynamic-status of the occupancy grid, ideally the locations of the detections line up with the positions of the grid columns marked occupied. Since the radar-detections originate from signals off scattering centers on an object, the neighboring occupancy grid columns can also be updated with the same range rate information. For every radar-detection a range dependent radius is computed. The radius will be smaller for large range values because the accuracy of the radar is less at large range values. The radius will also be dependent on the radar type. Within a circular neighborhood defined by this radius and the detection position, the information from the radar-detection will update any occupied grid columns. All occupied columns inside the radar-detection radius would be marked with the dynamic-status detection of the radar.

The system 10 includes a camera-unit 132 that renders a first-image 134 at the first-time and a second-image 136 at a second-time, wherein the first-image 134 and the second-image 136 are aligned with the field-of-view 26 of the lidar-unit 22, and the controller 30 is further configured to determine the registration-factor 82 of the column based on the first-cloud-points 56, the second-cloud-points 68, the first-image 134, and the second-image 136.

The system 10 includes a camera-unit 132 that renders a first-image 134 at the first-time 60 and a second-image 136 at a second-time 72, wherein the first-image 134 and the second-image 136 are aligned with the field-of-view 26 of the lidar-unit 22, and the controller 30 is configured to determine the registration-factor 82 of the column 48 based on the first-image 134 and the second-image 136 when the first-number 74 and the second-number 76 are both less than a count-threshold 148.

The system 10 includes a radar-unit 138 that detects a first-target-group 144 at the first-time 60 and a second-target-group 146 at the second-time 72, wherein the first-target-group 144 and the second-target-group 146 are aligned with the field-of-view 26 of the lidar-unit 22, and the dynamic-status 12 of the column 48 is determined based on tracking the radar-detection 126 and 128 in the first-target-group 144 and the second-target-group 146 that is closest to a center-line of the column 48 when the first-number 74 and the second-number 76 are both less than a count-threshold 148.

The system 10 includes a radar-unit 138 aligned with the lidar-unit 22, and the controller 30 is further configured to determine the dynamic-status 12 of the first-scan 58 occupied column 48 from the radar-unit 138 detection closest to the column 48 center.

The system 10 includes a radar-unit 138 that indicates a radar-detection and is aligned with the lidar-unit 22, and the controller 30 is further configured to determine the dynamic-status 12 of the occupied columns in the first scan 58 by creating a circle 140 around a radar-detection 126 and labeling all columns 48 inside the circle 140 with the dynamic information 142 of the radar-detection 126.

While this invention has been described in terms of the preferred embodiments thereof, it is not intended to be so limited, but rather only to the extent set forth in the claims that follow.

We claim:

1. An object detection system that determines a dynamic-status of an object proximate to an automated-vehicle, said system comprising:

a lidar-unit used to detect cloud-points in a field-of-view of the lidar-unit proximate to a host-vehicle; and a controller in communication with the lidar-unit, said controller configured to define an occupancy-grid that segregates the field-of-view into an array of columns, determine a first-occupancy-status of a column based on a first-height of first-cloud-points detected in the column by a first-scan taken by the lidar-unit at a first-time, wherein the first-occupancy-status is determined to be occupied when the first-height is greater that a height-threshold, determine a second-occupancy-status of the column based on a second-height of second-cloud-points detected in the column by a second-scan taken by the lidar-unit at a second-time subsequent to the first-time, wherein the second-occupancy-status is determined to be occupied when the second-height is greater than the height-threshold, determine a first-number of the first-cloud-points detected in the column by the first-scan, determine a second-number of the second-cloud-points detected in the column by the second-scan, determine a dynamic-status of the column only if the column is classified as occupied by either the first-occupancy-status or the second-occupancy-status, wherein the dynamic-status of the column is determined to be moving when a count-difference between the first-number and the second-number is greater than a difference-threshold, and the dynamic-status of the column is determined to be static when the count-difference is not greater than the difference-threshold and a registration-factor that aligns the first-cloud-points to the second-cloud-points is less than a registration-threshold.

2. The system in accordance with claim 1, wherein the controller is configured to align the second-scan to the first-scan based on movement of the host-vehicle between the first-time and the second-time.

3. The system in accordance with claim 1, wherein the column is associated with an adjacent-column to form a cluster when both the column and the adjacent-column are classified as occupied, and the dynamic-status of the cluster is determined to be moving when a majority of the columns that form the cluster are classified as moving.

4. The system in accordance with claim 1, wherein the system includes a camera-unit that renders a first-image at the first-time and a second-image at a second-time, wherein the first-image and the second-image are aligned with the field-of-view of the lidar-unit, and the controller is further configured to determine the registration-factor of the column based on the first-cloud-points, the second-cloud-points, the first-image, and the second-image.

5. The system in accordance with claim 1, wherein the system includes a camera-unit that renders a first-image at the first-time and a second-image at a second-time, wherein the first-image and the second-image are aligned with the field-of-view of the lidar-unit, and the controller is configured to determine the registration-factor of the column based on the first-image and the second-image when the first-number and the second-number are both less than a count-threshold.

6. The system in accordance with claim 1, wherein the system includes a radar-unit that detects a first-target-group at the first-time and a second-target-group at the second-time, wherein the first-target-group and the second-target-group are aligned with the field-of-view of the lidar-unit, and the dynamic-status of the column is determined based on tracking of a target in the first-target-group and the second-target-group that is closest to a center-line of the column when the first-number and the second-number are both less than a count-threshold.

7. The system in accordance with claim 1, wherein the system includes a radar-unit that indicates a radar-detection and is aligned with the lidar-unit, and the controller is further configured to determine the dynamic-status of the occupied columns in the first scan by defining a circle around a radar-detection and labeling all columns inside the circle with the dynamic information of the radar-detection.

8. The system in accordance with claim 1, wherein each column is divided into a plurality of vertical cells.

9. The system in accordance with claim 8, wherein each cell has an area of 0.2 square meters on one side.

* * * * *